(12) United States Patent
Harris

(10) Patent No.: US 8,266,709 B2
(45) Date of Patent: Sep. 11, 2012

(54) ADJUSTABLE RESOLUTION MEDIA FORMAT

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 590 days.

(21) Appl. No.: 12/365,861

(22) Filed: Feb. 4, 2009

(65) Prior Publication Data

US 2010/0199101 A1 Aug. 5, 2010

(51) Int. Cl.
*G06F 21/00* (2006.01)
(52) U.S. Cl. .......... 726/26; 713/189; 380/269; 380/252; 726/33
(58) Field of Classification Search .............. 700/94; 341/61; 704/500; 380/269, 252
See application file for complete search history.

(56) References Cited

U.S. PATENT DOCUMENTS

| | | | |
|---|---|---|---|
| 7,395,321 B1 | 7/2008 | Oz et al. | |
| 7,460,668 B2 * | 12/2008 | Grab | 380/240 |
| 7,555,785 B2 * | 6/2009 | Levy | 726/28 |
| 7,730,184 B2 * | 6/2010 | Camp, Jr. | 709/226 |
| 2003/0216824 A1 * | 11/2003 | Chu et al. | 700/94 |
| 2004/0199855 A1 | 10/2004 | Heylan | |
| 2004/0267533 A1 | 12/2004 | Hannigan et al. | |
| 2006/0074851 A1 * | 4/2006 | Nagai et al. | 707/1 |
| 2006/0136340 A1 * | 6/2006 | Park | 705/52 |
| 2007/0079130 A1 | 4/2007 | Vandewater et al. | |
| 2007/0253552 A1 * | 11/2007 | Garcia et al. | 380/201 |
| 2008/0012735 A1 | 1/2008 | Kim | |
| 2008/0181449 A1 | 7/2008 | Hannigan et al. | |
| 2008/0270804 A1 | 10/2008 | Terranova et al. | |

* cited by examiner

*Primary Examiner* — Jung Kim
*Assistant Examiner* — Robert Leung
(74) *Attorney, Agent, or Firm* — Law Office of Scott C. Harris, Inc.

(57) ABSTRACT

A play limit is set for a media file. The play limit can be, for example a date, or a number of times that the file has been played. When the file exceeds the play limit, the quality of the file playing is degraded.

18 Claims, 1 Drawing Sheet

ADJUSTABLE RESOLUTION MEDIA FORMAT

BACKGROUND

Compressed media may include compressed audio, compressed video, or other forms of media.

One popular compressed media is the so-called MP3 music format. Conventional MP3 format allows a variable audio quality depending on the number of bits that are assigned to carry the audio. For example, a smaller bit rate produces a more coarse approximation of the final signal. This provides a smaller file size as a tradeoff for a lower quality audio playback. A larger bit rate provides a larger file, but more closely approximates the way in which the actual signal is played. Variable bit rates may change the bit rate from area to area.

The sample rate of MP3s may also change. A standard MP3 sample may be 44.1 kHz, the same sampling rate is used in a conventional CD. In addition, however, other sampling rates can exist. People conventionally use very low sampling rate, such as 8 kilohertz for simple spoken audio. On the other hand, professional music may be sampled at 96 kHz or more.

In general, a smaller file means less accurate playback; a larger file means more accurate playback.

The MP3 file uses a header with various parameters about the file part. The header is followed by a data area. The header and data area together is called a frame. Each frame may include a specified amount of data, and may have data for any desired amount of time. In a typical MP3 file, the frame typically might around or somewhat less than a second.

Techniques of restricting play and/or transfer of media signals are known. Digital rights management on the MP3s have been met with significant resistance.

SUMMARY

The present application recognizes that a compressed media signal, such as an MP3 file, once transferred, is good and playable forever.

The present application describes a technique for storing and processing compressed media information in a way that controls the media to be read back, and stores information that is based on the number of times the data has been read. According to another embodiment, the file includes information indicative of a number of times that the media can be read back or played the media without degradation of the contents of the media. After that number of times, the media playback is automatically degraded by the playing system.

DETAILED DESCRIPTION

Figure 1:
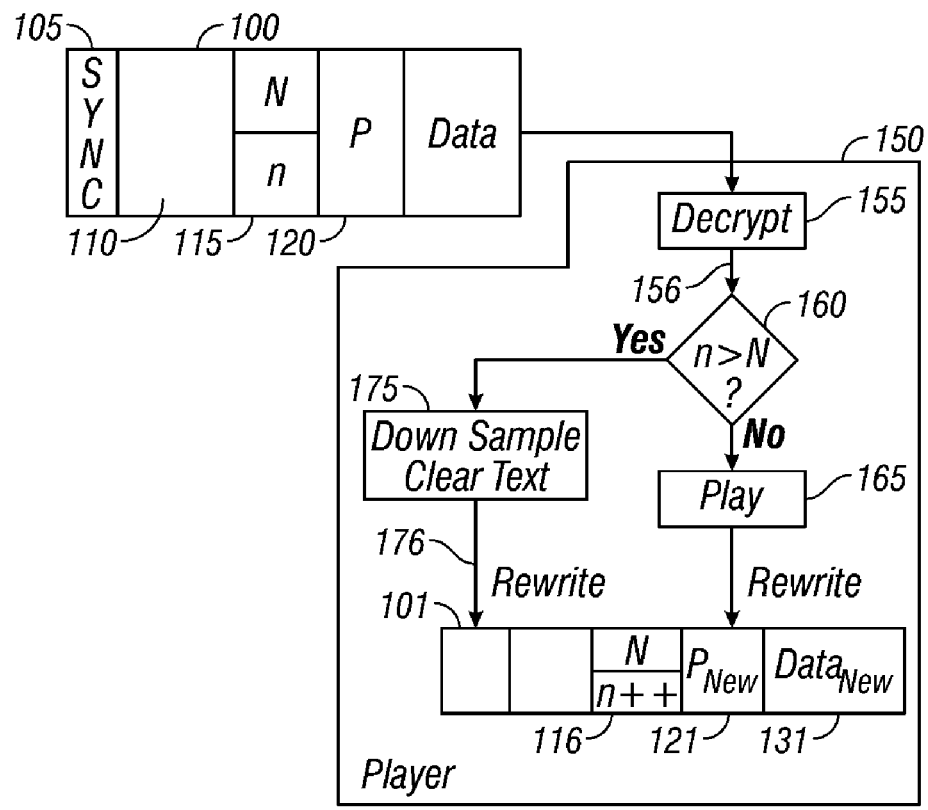
FIG. 1 shows a first embodiment which rewrites all or part of the file each time the file is played and the rewritten file or part indicates that the file has been played an additional time.

An embodiment is shown with reference to the figures. FIG. 1 shows a compressed audio file 100, for example an MP3 file. While the present embodiment refers to audio files, it should be understood that the embodiments are intended to also apply to compressed video files, as well as compressed files that include information indicative of any item that can be played back from a stored form.

The file 100 may include, as conventional, a sync area 105, followed by a control area 110 which can include identification information, layer information, bit rate and frequency information as well as any other information that is used to decode and play the eventual information.

The files of the embodiments may include play limits. After the play limits have been exceeded, the quality of the media stored on the file can be degraded.

In a first embodiment, the file may also store the number of allowable times that the file can be played, as play times information 115. The play times may include two parts: N indicating a total a number of times that the file can be played without degradation, as well as n indicating how many times the file has been played.

In one embodiment, the variable n may be based on the player, where each file can be played N times on a specific player. The file can be moved to another player and played another N times. The variable N and/or n may also store information about the player(s) that have played the file. In this embodiment, the value n includes a serial number or other unique identifier indicating the player.

An embodiment also includes a protection layer shown as P 120. The protection layer may include one or more encryption codes, used for decrypting encrypted information stored within the data portion 130.

The actual data area 130 which may include encrypted audio information, encrypted in a compressed format. Any compression technique, such as Huffman coding or MPEG coding, may be used for the compression. In one embodiment, the signal is MP3-encoded.

In operation, the signal 100 is received by a player module 150. The player module will first, at 155, use the information in the protection area 120 to decrypt the encrypted audio. This decryption operation 155 produces in essence clear text music at 156. This clear text music, however, is still compressed.

At 160, a test is made to determine if the value n>N for this specific player, that is whether the number of times the music file has been played on this player is greater than the threshold of total times that the file can be played. If not, then the file is played normally at 165.

Note that even if the value n is greater than one—e.g., the file has been played before, it might not have been played before on this specific player. For example, if the file has been played on some other player, n might be 2, and the serial number of that other player is stored as part of the 2. However, playing the file on a different player still starts at n=1. This produces a special advantage. A user can download the file, and play it and share it. Even if the file is close to the end of the number of times it can be played, sharing the file to a new player always restarts the number of allowable plays to the set number.

After playing at 165, the file is rewritten to a new file 101. The new file 101 has n incremented, and P has been changed to a new key. According to an embodiment, the value of P 120 is tied to the value of n 115. That is, P 120 can only be used for decrypting the data when the value n is a certain value. When n is incremented, to n+1, the previous value P cannot work to decrypt the data 130. This may use, for example, a hardware checksum detector to require n=x before P can be used. Alternatively, the value n can be used as part of the decryption key and data will not be decryptable unless n is correct.

In one embodiment, the value of P for n=1 includes decryption keys for n=1, 2, 3, 4 and 5 (assuming 5 plays). The key for n=1 is used to decrypt when n is one. When n is incremented to n=2, the new value of P includes decryption keys only for 2, 3, 4 and 5, that is, the decryption value for n=1 has been removed once n is incremented to 2. P may also include information for encryption at n=1 to 5, for example.

The file is rewritten with the new values after an increment. In the embodiment where multiple encryption keys are stored, the encryption keys for the already-passed values can be removed in the rewritten file.

Therefore, at 170, the new data structure is formed where the value of n has been incremented to a new value 116, and a new value of P 121 has been formed that corresponds to the new value of n 116. The data 130 is re-encrypted with a new encryption key to form new encrypted data 131. The new encrypted data can be decrypted using information in the new value P, but cannot be encrypted using the old value P 120. That new value of P is keyed to the new value of n, and allows the new P to be used to decrypt the new encrypted data 131.

The sync signal and header 110 may be the same, but the rest of the music signal 101 may be changed.

Another embodiment may operate without encryption or with a constant encryption key that does not change.

If n is found to be greater than N at 160, flow passes to a new direction, where the decrypted cleartext 175 is downsampled by some value. For example, the already compressed audio or video may be further compressed according to a more aggressive compression scheme so that the played-back file has lower quality. The downsampling at 175 makes a smaller file, but decreases the resolution of the signal, and hence decreases the amount of information from that file.

In one embodiment, each downsampling may be by 10%, 20%, or some other value. The downsampled file 176 is a reduced quality file. It can still be played on the player, but has less quality than the other file. The value 176 is rewritten to form the new data part 131. The new signal includes new data, a new encryption key, and a new value of n.

In this embodiment, after the file has been played more than N times, its resolution begins to suffer on subsequent playings. Eventually, the file quality will degrade to the point that it will sound bad. However, the file can still be played, for example to remind the user if they like the file, or just to avoid having the user feel cheated by no longer being able to play the file.

This embodiment may be used for a preview mode where the files can be distributed and played by any users as a preview, e.g., do they like the file contents. Another use of this embodiment may allow selling a media file that can only be used for a limited time for a limited price. After that time, (number of plays, or in another embodiment on a date), the file quality begins to degrade.

The recoding of the data files produces a new data packet 101 that replaces the previous data packet 100. Values of the data packet are also changed. According to one embodiment, the players include structure, e.g., hardware or software, that forces them to carry out this information changing. Moreover, the incrementing of the value n may be carried out in hardware. Since the encryption key 120 is keyed to the value of n, this may prevent the media from being played by the player unless the entire process is followed by decryption, variable n incrementing, encryption key etc. This prevents playing the file unless the variable is incremented, and unless the quality of the file is reduced if necessary.

The above has described one particular form of encryption, however it should be understood that other encryption forms may similarly be used, and more sophisticated encryption forms such as Blu-Ray encryption may be used on this disc.

Moreover, the operation can be carried out during streaming, so that one or more frames is read, played at 165, and then re-encoded at 170 while the next frame is re-encrypted and re-encoded.

Another embodiment stores the read-limited medium information on a read-only disk, such as a CD or DVD. The variable information n is stored in the player in this embodiment. In this embodiment, the data 130 may not be re-encrypted each time, since the data can only be read from the disk, and new data cannot be stored on the disk. The disk may include encrypted information that is decrypted by a decryption code, either on the disk itself, in the player, or obtained some other way.

Another embodiment may use the techniques above without encryption, just relying on the player to carry out the read protection.

Figure 2:
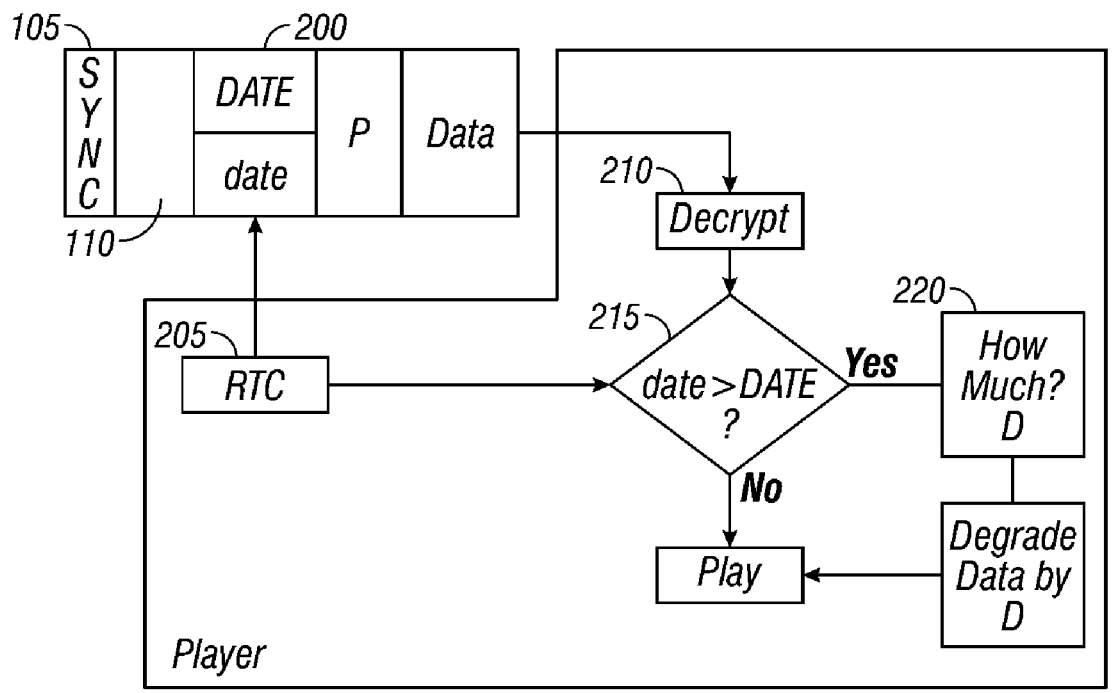
FIG. 2 shows a second embodiment, in which the player determines a date and compares that with a date in the file.

The above embodiment refers to an embodiment which limits the number of times that the media can be played. Another embodiment uses date protection in place of or in addition to the number of times played protection. FIG. 2 illustrates this embodiment one in which many of the values are the same within the data frame 200. However, instead of the value n, this system uses a system of dates, where the media stores the value DATE, after which the file begins degrading. The value DATE represents the real time from a real time clock 205 of the playing process. As in other embodiments, the playing process may decrypt at 210. At 215, the system determines if the current date is before or after the set value DATE.

After the set DATE, the contents of the file begin degrading. The amount of time after the set date in the variable DATE is used to set the amount of degradation of the file at 220. At 230, the file is degraded by the amount determined at 220: the amount by which the current date exceeds the set variable DATE.

In this embodiment, the file need not be rewritten. The current date is a fixed value that is received from the real time clock 205 of the player. The file playing is degraded in proportion to the amount by which the current date is past the variable date. In one embodiment, each day past the date set causes further degradation in the played contents.

In both the first and second embodiments, the data can also be stored without encryption, thereby avoiding the decryption.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the media can be video such as MPEG or avi or windows media video. Different forms of media degradation and different forms of the degradation schedule are contemplated.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

The playing devices described herein may be any kind of electronic devices, e.g., a computer, either general purpose, or some specific purpose computer such as a dedicated media player, e.g., an IPOD™ or DVD or Bluray™ player, or a playing function within a special purpose computer such as a PDA, cellphone, or laptop.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended.

What is claimed is:

1. A method of playing a media file, comprising:
    comparing information with an indicia of a play limit for a first media file to be played;
    based on said comparing, determining if said first media file is beyond said indicia of play limit;
    first playing said first media file without changing a quality of said media file, only if said media file is not beyond said play limit as determined by said determining; and
    if said first media file is beyond said play limit as determined by said determining, then creating a degraded quality media file which is of a smaller size than said first media file and storing said degraded quality media file in place of said first media file, and second playing said degraded quality media file, wherein said play limit comprises a fixed number of times that the first media file can be played on a first specified player, and said comparing compares a number of times that the first media file has been played on said first specified player with said fixed number of times, and where the first media file can be played said fixed number of times on a different specified player, even after the first media file has been played said specified number of times on said first specified player, where said play limit is determined based on a count, and said count restarts when said first media file is played on a different player.

2. A method as in claim 1, wherein said second playing comprises degrading the quality of said first media file by an amount related to an amount by which said first media file is beyond said play limit.

3. A method as in claim 1, wherein said play limit is a fixed number of times that the first media file can be played, and said comparing compares a number of times that the first media has been played with said fixed number of times.

4. A method as in claim 1 wherein said play limit is a fixed date, and said comparing compares a current date with said fixed date.

5. A method as in claim 1, further comprising decrypting the first media file, and requiring information indicative of said play limit to decrypt the first media file.

6. A player for playing media, comprising:
    a playing part, which reads information indicative of a first media file to be played, and plays a media file based on said information;
    a storage part, that stores information indicative of a play limit for said first media file;
    a play limit detection part, detecting current information and comparing said current information with said play limit information;
    wherein said playing part plays said first media file at an original quality when said play limit detection part detects that said current information represents said play limit not having been exceeded and degrades a quality of said first media file when said play limit detection part detects that said current information represents said play limit having been exceeded, to create and store a degraded quality media file that is of a smaller size than said first media file, and to play said degraded quality media file responsive to said current said current information represents said play limit having been exceeded, wherein said storage part stores information indicative of a number of times that said first media file has been played on a first specific player, and wherein said playing part degrades the quality only if the first media file has been played on the first specific player more times than a number of times represented by said play limit information and does not count times that the first media file has been played on another player other than said first specific player toward said number of times, where said play limit is determined based on a count, and said count restarts when said first media file is played on a different player.

7. A player as in claim 6, wherein said play limit is associated with said file and is read by said player as part of reading said first media file.

8. A player as in claim 6, wherein said playing part reads an encrypted media file and decrypts said encrypted media file.

9. A player as in claim 8, wherein said playing part uses said current information as part of said decrypting.

10. A player as in claim 6, wherein said storage part stores a date, and said play limit detection part determines if a current date is later than said date stored in said storage part, and wherein said playing part degrades the quality of said first media file only if the current date is later than the date stored in said storage part.

11. A player for playing media, comprising:
    a media reading player, that reads information from a read-only media, and based on said information, produces an output indicative of said information from said read-only media;
    a media storage, which stores information indicative of limit information for said read-only media,
    said media reading player responsive to said limit information and wherein said limit information changes a way that the information is played,
    wherein said media storage stores information indicative of a number of times that a first media file included in said information has been played on the media reading player, and wherein said media reading player changes the way that the information is played only if the first media file has been played on the media reading player more times than a number of times represented by said limit information and does not count times that the first media file has been played on another player other than said media reading player toward said number of times, where said limit information is determined based on a count, and said count restarts when said information is played on a different player than said media reading player.

12. A player as in claim 11, wherein said limit information causes said file to be degraded in quality when said limit is exceeded.

13. A player as in claim 11, wherein said limit information represents a number of times that the file has been played.

14. A player as in claim 11, wherein said limit information represents a date, wherein said player includes a real-time clock, and said real-time clock produces date information that is compared with said date information included in said limit information.

15. A player as in claim 12, wherein said media reading player degrades said first media file in quality by an amount that is proportional to an amount by which said limit is exceeded, wherein said first media file is degraded by a first amount when said limit is exceeded by a first amount, and is degraded by a second amount when said limit is exceeded by a second amount different than said first amount.

16. A player as in claim 11, wherein said first media file is encrypted, and said player uses different decryption keys to decrypt the file at different times.

17. A method as in claim 1, wherein said creating the degraded quality media file comprises downsampling the first media file in a way that reduces a quality of the first media file and a size of the first media file.

18. A player as in claim 6, wherein said playing part creates said degraded quality media file by downsampling the first media file in a way that reduces a quality of the first media file and a size of the first media file.

* * * * *